United States Patent
Silver et al.

(10) Patent No.: US 6,961,578 B2
(45) Date of Patent: Nov. 1, 2005

(54) ENHANCED CALL DELIVERY SYSTEM FOR INTEROPERABILITY BETWEEN CIRCUIT SWITCHED AND PACKET SWITCHED NETWORKS

(75) Inventors: Andrew Silver, Dallas, TX (US); Gary B. Stephens, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 266 days.

(21) Appl. No.: 10/288,207

(22) Filed: Nov. 5, 2002

(65) Prior Publication Data

US 2004/0058688 A1 Mar. 25, 2004

Related U.S. Application Data

(62) Division of application No. 09/359,818, filed on Jul. 23, 1999, now Pat. No. 6,560,457.
(60) Provisional application No. 60/094,035, filed on Jul. 24, 1998.

(51) Int. Cl.[7] .................................................. H04Q 7/20
(52) U.S. Cl. .................................. 455/456.3; 455/432.1
(58) Field of Search ........................... 455/414.1, 414.2, 455/432.1, 432.2, 456.1, 456.3

(56) References Cited

U.S. PATENT DOCUMENTS

| 5,590,133 | A  |   | 12/1996 | Billstrom et al. |
|-----------|----|---|---------|------------------|
| 5,889,770 | A  | * | 3/1999  | Jokiaho et al. ............. 370/337 |
| 6,081,723 | A  | * | 6/2000  | Mademann ............... 455/456.1 |
| 6,104,929 | A  | * | 8/2000  | Josse et al. .................. 455/445 |
| 6,230,009 | B1 | * | 5/2001  | Holmes et al. ........... 455/426.1 |
| 6,456,852 | B2 | * | 9/2002  | Bar et al. ................. 455/456.1 |
| 6,463,055 | B1 | * | 10/2002 | Lupien et al. .............. 370/353 |

FOREIGN PATENT DOCUMENTS

WO    WO 97/15154    4/1997

* cited by examiner

*Primary Examiner*—Nick Corsaro
(74) *Attorney, Agent, or Firm*—Carr LLP

(57) ABSTRACT

The invention expedites the delivery of a call originating in a circuit-switched network to a mobile terminal camped on a packet-switched network. Information representing the location of the mobile terminal in the packet-switched network is provided to the circuit switched network. A call setup with the mobile terminal is initiated with reference to the previously received location information, frequently more expeditiously and using less resources. Location-based services are also provided by the circuit-switched network with access to such mobile terminal location information.

19 Claims, 6 Drawing Sheets

LEGEND:

◯ BSS (e.g., 123, 124 and 125)

△ BTS (e.g., 117, 118 and 119)

---- PACKET-SWITCHED NETWORK (DATA NETWORK)

—— CIRCUIT-SWITCHED NETWORK (VOICE NETWORK)

ENHANCED CALL DELIVERY SYSTEM FOR INTEROPERABILITY BETWEEN CIRCUIT SWITCHED AND PACKET SWITCHED NETWORKS

CROSS-REFERENCE TO RELATED APPLICATIONS

This is a divisional application of U.S. Ser. No. 09/359,818, filed on Jul. 23, 1999, now U.S. Pat. No. 6,560,457B1, issued May 6, 2003, and which claims benefit of U.S. Provisional Application Ser. No. 60/094,035, filed on Jul. 24, 1998.

TECHNICAL FIELD OF THE INVENTION

This invention relates to delivery of telecommunications services and, more particularly, to sharing of information representing the geographic location of a mobile terminal by two networks serving the terminal in substantially the same geographic area.

BACKGROUND OF THE INVENTION

A recent development in the field of wireless telecommunications is the capability of transmitting data through packet-switched networks. Perhaps the most well-known packet-switched network is the "Internet" world-wide computer network, which is also often referred to as the "World-Wide Web." Another familiar packet-switched network is a "Local Area Network" or "LAN" which is used principally to interconnect personal and other computers within an office or other enterprise.

Packet-switched networks are typically characterized by the transmission of data in a string of separate "packets" or "frames," each of which may be directed through different paths through the packet-switched network to the same ultimate destination. Upon receipt at the destination, the packets of information are assembled and used in the correct, original order, as if the entire string had arrived in that order, following the same physical path.

Due to the flexibility, capabilities and speed associated, network systems, standards and transmission protocols are being developed to transmit data and voice to a single wireless terminal. Such terminals include mobile telephones, personal computers (such as laptops) and the like through which a user may desire to send both voice and data communications. Perhaps the most common example of such activities is use of a mobile phone to make telephone calls and also to send and receive e-mail messages and access web pages on the Internet. Use of wireless terminals for this dual purpose is expected to increase as telephone, fax and data transmission services continue to converge. Eventually, it is expected that mobile telephones and personal computers will utilize wireless technology to allow both mobile telephone calls and access to packet-switched networks without the need for land line connections. Other applications will be apparent, as well, to one of ordinary skill in the art and may be developed in the future.

Existing wireless systems providing voice and SMS services utilize "circuit-switched" networks to direct their transmissions. As currently envisioned, wireless data transmission services will be delivered through a "packet-switched" network that is physically separate from wireless networks presently providing circuit voice, limited circuit data and limited Short Message Service (SMS) services. Circuit-switched systems differ fundamentally from packet-switched systems in that all information comprising the call or SMS follows the same fixed-sized path within the network and, therefore, cannot provide the same capacity and performance for transmission of data at acceptable costs. Consequently, physically separate packet-switched networks will be constructed to provide wireless data transmissions services, in addition to the existing and developing circuit-switched systems offering voice and SMS transmission services. A network protocol used by packet-switched and circuit-switched networks to communicate with each other is ANSI-41.

As envisioned, a mobile terminal will communicate with the packet-switched network in the transmission of data. When a telephone call, for example, is made requiring transmission of voice information, the mobile terminal will communicate with the circuit-switched network. Examples of circuit-switched networks in existence and under development are AMPS, TDMA, GMS, CDMA, and CDMA 2000. Examples of a number of available packet-switched networks providing wireless data transmission services include GPRS (General Packet Radio Service) data networks, also identified as GPRS-136, and EDGE (Enhanced Datarate Global Evolution) also identified as GPRS-136HS.

However, certain inefficiencies are inherent in using both circuit-switched and packet-switched systems to provide wireless voice and data transmission services. In particular, as currently envisioned, a mobile terminal relying on both networks for voice and data services will "camp on" or remain in communication this approach tends to preserve resources of both systems by reducing the amount of air time and control messaging that would otherwise be required if the mobile terminal camped on the system transmitting telephone calls and SMS messages, doing so creates a delay (typically 3 to 5 seconds per call) in connecting or completing setup of incoming calls to the mobile terminal.

Because the mobile terminal will be camped on the network providing data transmission services at the time of an incoming telephone call or SMS message, the page message typically used to alert the mobile terminal to the call and request a response is directed through the data transmission network. This is considered preferable because information representing the location of the mobile terminal is also highly likely to be known by the data network on which the mobile terminal is camped. Such location information is used to route the page request to the packet-switch currently servicing the mobile terminal. Although forwarding the page request through the data network avoids unnecessary use of transmission resources of the circuit-switched voice network that would otherwise be required to transmit a global page to all locations within the network or direct a page to an area in which the mobile terminal is not found, additional delay in both sending the page and receiving a response from the mobile terminal is occasioned. It will be apparent that such delay undesirably consumes additional resources of the voice network while awaiting a response from the mobile terminal and reduces the grade of service to the calling party and the mobile terminal user as they await setup of the call.

SUMMARY OF THE INVENTION

These and other disadvantages are overcome by the method and apparatus of the present invention, which expedites the delivery of a call originating in a circuit-switched network to a mobile terminal camped on a packet-switched network. Information representing the location of the mobile terminal in the packet-switched network is provided to the circuit switched network. A call setup with the mobile terminal is initiated with reference to the previously received location information, frequently more expeditiously and using less resources.

In another aspect of the invention, call setup is initiated by the circuit-switched network with reference to the mobile terminal location information provided by the packet-switched network, independently of a page response of the mobile terminal.

In yet another aspect of the invention, information representing the location of the mobile terminal within the packet-switched network is mapped to the location of one or more transceiver locations in the circuit-switched network.

In still another aspect of the invention, call setup between the mobile terminal and the circuit-switched network is triggered with reference to one or more page requests tunneled through the packet-switched network to the mobile terminal.

In yet another aspect of the invention, information representing the location of a mobile terminal within the packet-switched network is periodically provided to the circuit-switched network.

In still another aspect of the invention, location-based telecommunication features or services are provided via a circuit-switched network with reference to information representing the location of the mobile terminal within a packet-switched network.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
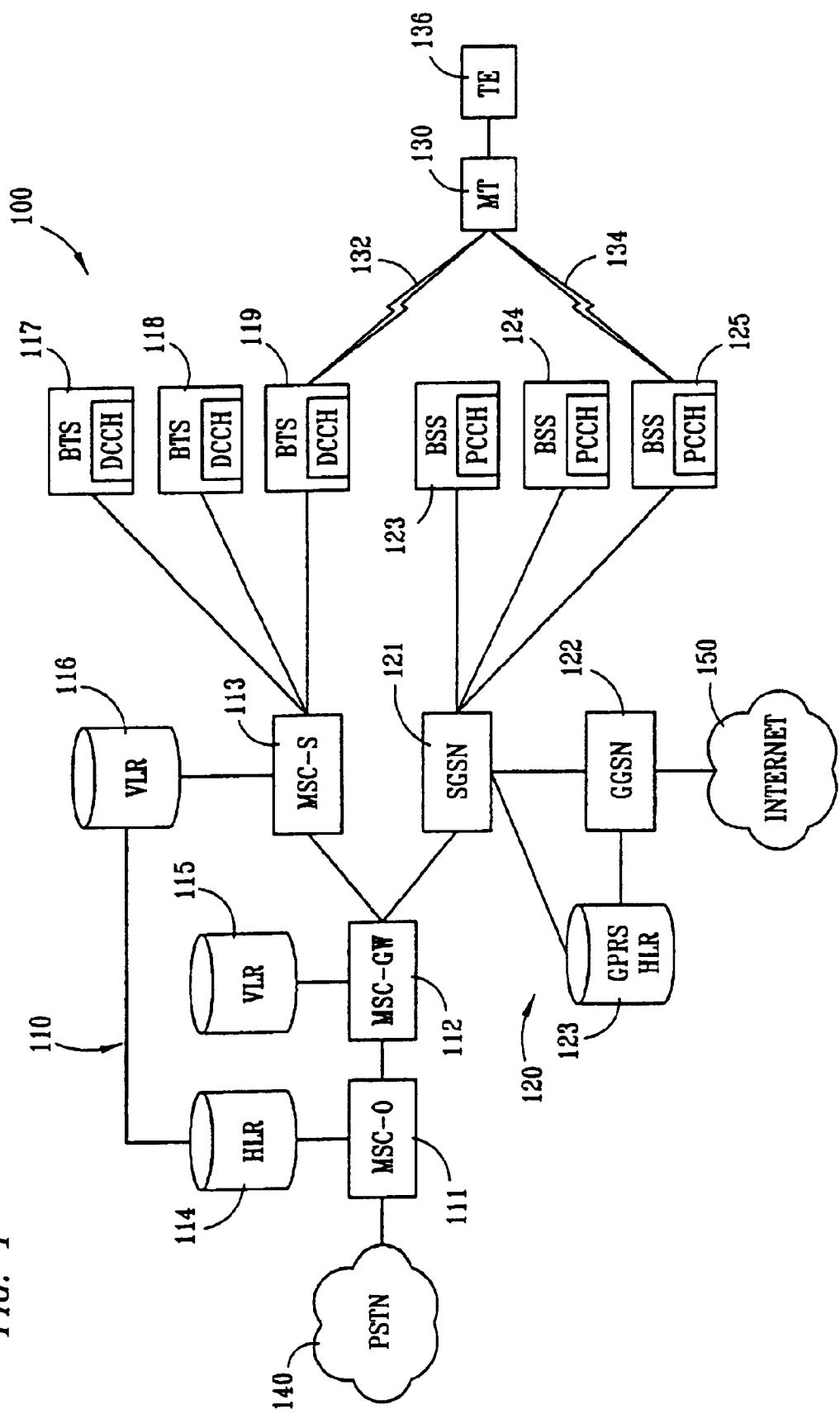
FIG. 1 is a schematic diagram illustrating components of a circuit-switched wireless system and a packet-switched wireless system incorporating the present invention.

Referring now to FIG. 1, there is shown a wireless telecommunications network 100, comprising a circuit-switched network 110 and a packet-switched network 120. The network 100 provides voice, SMS and data transmission services to a mobile terminal (MT) 130 through wireless links 132 and 134. In the embodiment shown, circuit-switched network 110 operates in accordance with ANSI-41 standards and packet-switched network 120 operates in accordance with proposed standard GPRS-136; however, it will be apparent to those skilled in the art that other circuit-switched and packet-switched networks can use or incorporate the present invention. The wireless telecommunications network 100 provides wireless telecommunication services to MT 130 from a public switched telephone network (PSTN) 140, the Internet 150, or other packet-switched networks, as well as other mobile terminals (not shown). Provisional Application Ser. No. 60/094,035 is herein incorporated by reference for all purposes.

The MT 130 is shown in FIG. 1 coupled to a Terminal Equipment (TE) 136 that comprises a personal computer or other data processing device. As shown servicing TE 136, the MT 130 is a dual-mode terminal capable of communication with networks 110 and 120 via wireless links 132 and 134, respectively. It will be apparent that MT 130 may alternatively be a mobile telephone or other device capable of servicing a user with data and voice transmissions with circuit-switched network 110 and packet-switched network 120.

Circuit-switched network 110 includes functional objects typical of ANSI-41 systems. Specifically, mobile switch controllers (MSC) 111, 112 and 113 are circuit switches that perform numerous operation and control functions within the network 110, including directing traffic and messages, as well as performing call setup functions. MSC 111 is coupled to home location register (HLR) 114; MSC 112 is coupled to visiting location register (VLR) 115; and MSC 113 is coupled to VLR 116. HLR 114 maintains information and features relating to each MT originally registered within the network 110, while VLR 115 and 116 maintain such information with respect to all MTs actually registered within the network 110.

One or more Base Transceiver Stations (BTS) 117, 118 and 119 transmit and receive radio communications over wireless links similar to link 132, under the direction and control of MSC 113. Certain operation and control information and parameters are exchanged between MT 130 and one or more of BTS 117, 118 and 119 via a Digital Control Channel (DCCH) over the wireless link 132.

Packet-switched network 120 includes functional objects typical of those envisioned for the proposed GPRS-136 data transmission network. The proposed standards relating to GPRS-136HS architecture are hereby incorporated by reference for all purposes. Specifically, a Serving GPRS Support Node (SGSN) 121 is connected by a telecommunication link to Gateway GPRS Support Node (GGSN) 122. Both the SGSN 121 and GGSN 122 are connected by telecommunication links to GPRS HLR 123, which provides information similar to HLR 114 of the circuit-switched network 110. It should be noted that GPRS HLR 123 provides essentially the same information and functionality as an HLR currently used in GSM mobile systems. SGSN 121 is coupled to a number of Base Stations Subsystem (BSS) 123, 124 and 125, which are each capable of transmitting and receiving data to and from MT 130 via a radio link similar to wireless link 134. The wireless link 134 includes, in addition to data information, management and control information transmitted via a Packet Control Channel (PCC). Communication between the network 110 and MT 130 is accomplished using TDMA technology; however, it will be apparent that other wireless technologies, such as CDMA, GSM and CDMA-2000, could be utilized as well.

It will be apparent that the configuration of circuit-switched network 110 and a packet-switched network 120 shown in FIG. 1 is for purposes of illustration. Accordingly, numerous additional functional objects apparent to those skilled in the art are typically incorporated in such networks. The packet-switched network 120 transmits data to and from the MT 130 utilizing GPRS technology; however, it will be apparent that EDGE data transmission and other technology may be utilized as well.

Networks 110 and 120 interface through MSC 112 and SGSN 121 through a signaling interface which typically is used to transmit control messaging. MSC 112 is designated the "gateway" MSC for the system 110, as is indicated by the designation "GW." For purposes of example, MSC 111 is designated the "originating call" MSC and therefore bears the designation "O." MSC 113 functions as the "serving" MSC and therefore bears the designation "S."

At the time of an incoming call, MT 130 is idle, but is camped on one or more of BSS 123, 124 and 125, awaiting an incoming call from the voice network 110 or data transmission from the data network 120. The preference for camping on the packet-switched data network 120 under the proposed GPRS-136HS standard avoids unnecessary use of air time, bandwidth and other resources in both the circuit-switched voice network 110 and the packet-switched data network 120.

When an incoming call to MT 130 is placed over a voice channel originating in the circuit-switched network 110, a voice channel must be established via a wireless link, such as link 132. The call is set up, allowing full duplex (two way) communication between MT 130 and the calling party through the circuit-switched network 110, by signaling over both the DCCH and PCCH channels of the wireless links 132 and 134. This is accomplished by first sending a page request to set up the call. Typically, at the time a page for a voice transmission is received by MT 130, the wireless link 134 to the data network 120 is discontinued. It will therefore be appreciated that wireless links 132 and 134 are not active simultaneously under the existing ANSI-41 and GPRS-136HS standards. However, the present invention could be incorporated in systems in which wireless voice link 132 and wireless data link 134 are substantially continuously active, allowing substantially concurrent voice and data transmissions.

Figure 2:
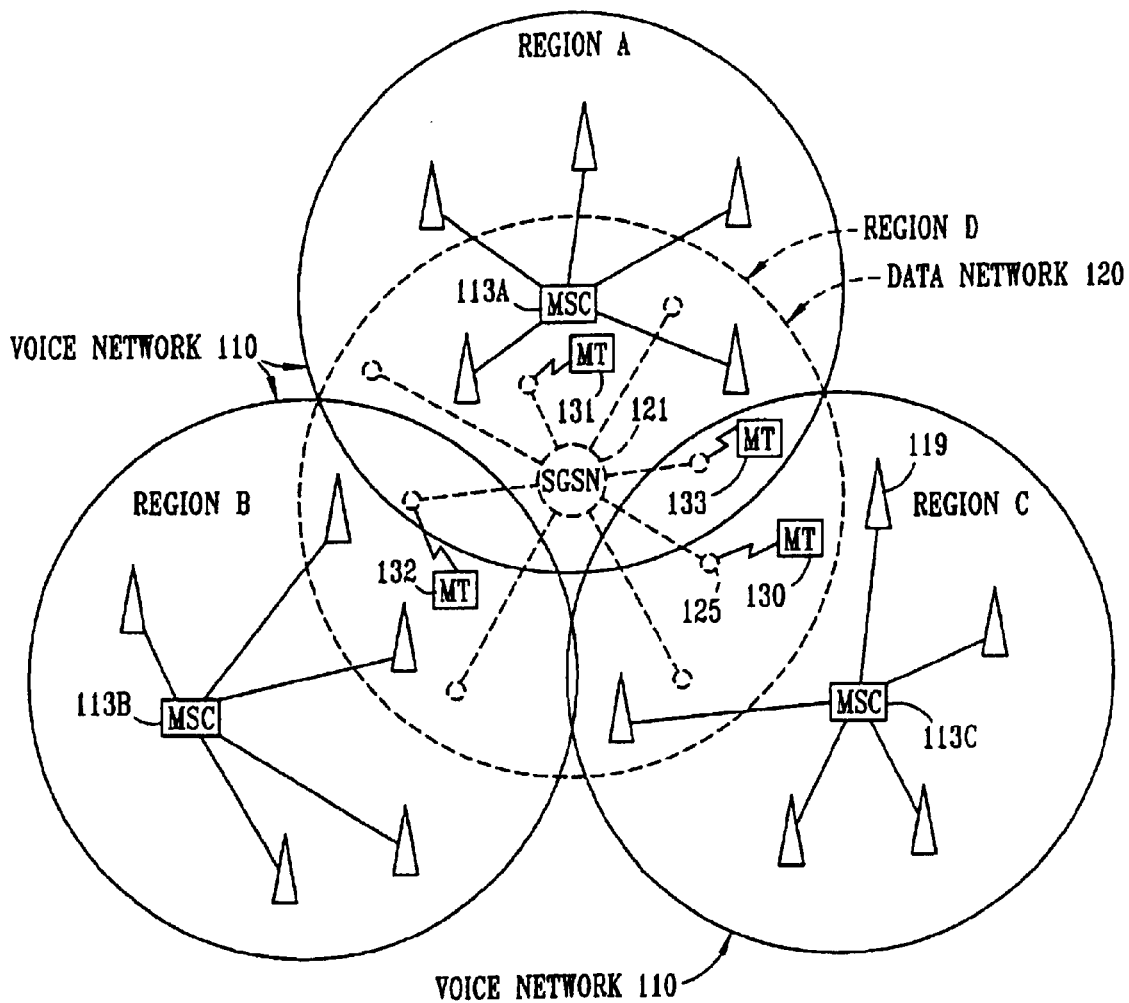
FIG. 2 is a schematic illustration of the geographic area of coverage of the circuit-switched and packet-switched wireless networks shown in the functional schematic illustration of FIG. 1.

The present invention facilitates setup of a full duplex telephone call originating in the network 110 to the MT 130 by providing to the network 110 information representing the location of MT 130. The associated benefits are illustrated with reference to FIGS. 1 and 2. FIG. 2 illustrates the geographic location of components and coverage areas of a circuit-switched network (voice network) 110 and a geographically overlapping packet-switched network (data network) 120. Base Transceiver Stations similar to BTSs 117, 118 and 119 of FIG. 1 are shown as triangles in FIG. 2 and Base Stations similar to BSSs 123, 124 and 125 associated with the packet-switched network 120 are illustrated as circles. The coverage area and components of the voice network 110 are illustrated in solid lines, whereas the components and coverage area of the data network area 120 is illustrated by broken lines. The geographic area of coverage by the voice network 110 comprises regions A, B and C, serviced by MSCs 113A, 113B and 113C, respectively, providing service similar to the single MSC 113 shown elsewhere in the FIGURES. It will be apparent that MSCs 111, 112 and 113 provide multiple functions beyond those described in the example of call setup described here. Similarly, the coverage area of the data network 120 is region D and is serviced by SGSN 121. For purposes of example, MTs 130, 131, 132, and 133 are shown at different locations within the coverage areas of both the voice network 110 and the data network 120.

Referring still to FIGS. 1 and 2, the present invention avoids delays of typically 3 to 5 seconds per call caused by the need to complete a page of an MT through the data network 120 and receipt of a page response before the voice network 110 can initiate setup of the call. Specifically, because an MT will be camped on the data network 120 when it must be paged for an incoming call, the page must be routed through the data network 120. This entails transmission time through the data network 120, both to and from the MT to which the call is intended, because the location of the MT is not provided to the voice network 110.

The present invention avoids this delay by providing the voice network 110 with information representing the location of the MT within the data network 120 before a page response is received from the MT through the data network 120, thereby allowing the call setup routine to be initiated with less delay. Such provision of MT location information to the voice network 110 is expected to reduce the radio transmission time between the MT and the voice network 110 by as much as 2 or 3 percent, thereby increasing the capacity and reducing the overall cost of the system.

Figure 3:
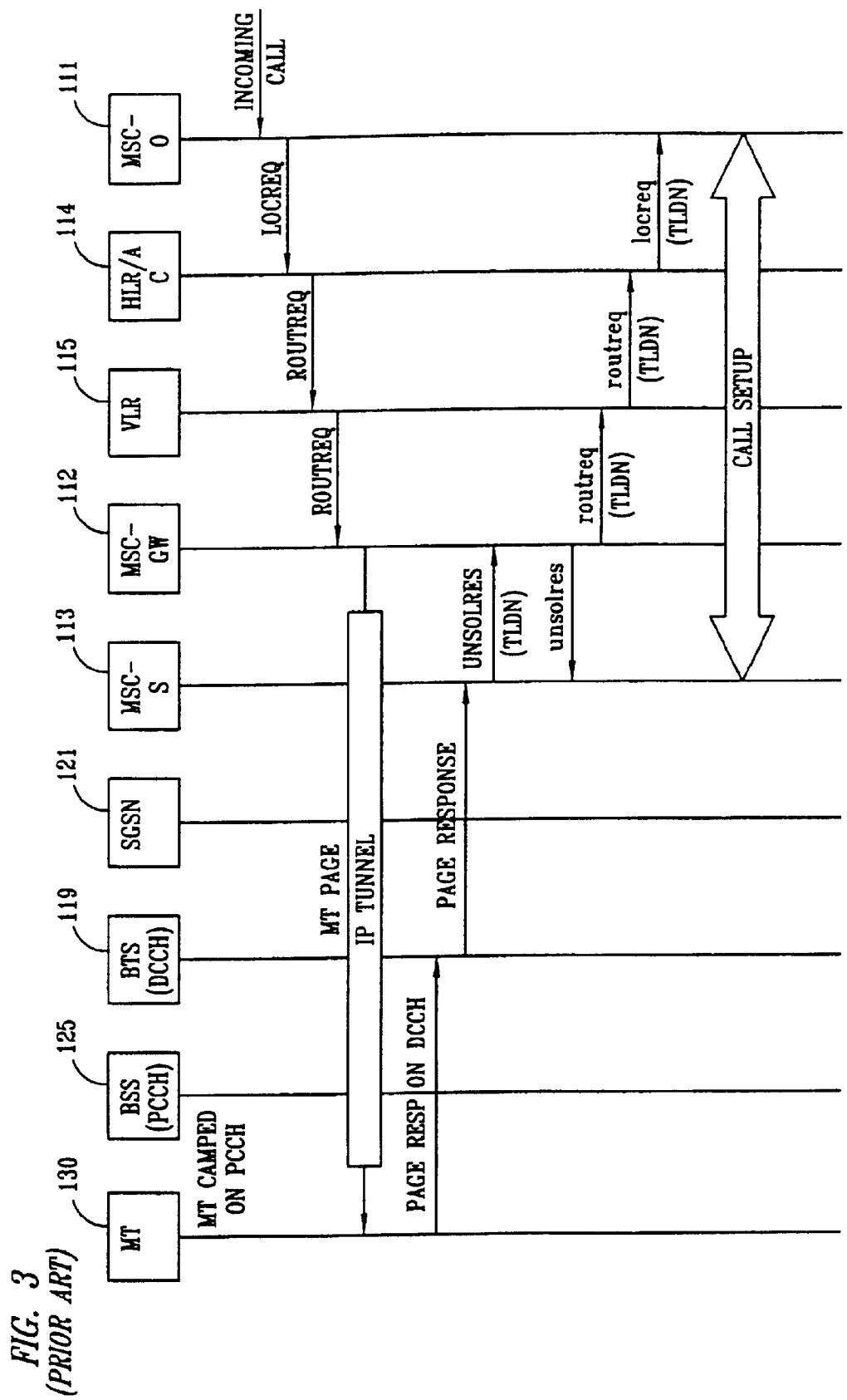
FIG. 3 is a message diagram illustrating the flow of messages through a circuit-switched voice network and a packet-switched data network of the prior art.

Referring now to FIG. 3, there is shown a message diagram illustrating the flow of messages in the prior art delaying initiating a call setup routine until a page response is received from the MT through the data network in which it is served. MT 130 is shown camped on a PCCH associated with BSS 125. An incoming call is originated through MSC-O 111, which in turn sends a location request (LOCREQ) to HLR 114. Routing Requests (ROUTREQ) are then sent in series from HLR 114 and VLR 115 to the gateway MSC 112. MSC 112 then encapsulates a page message directed to the MT 130 for transmission through an IP tunnel using well-known methods and means.

The page is directed to BSS 125, on which MT 130 is camped. BSS 125 is selected by the SGSN 121 to service MT 130 while it is camped on the data network 120, because the PCCH of BSS 125 provides the strongest signal of adjacent transmitters and consequently is one of the closest geographically to MT 130. Therefore, the geographic location of BSS 125 also provides the approximate location of MT 130.

Upon receiving the page from the data network 120 over the PCCH channel on which MT 130 is camped, MT 130 transmits a page response to the voice network 110 over its DCCH channel. The page response is received by a neighboring BTS 119 and transmitted to MSC 113, which then initiates the call setup sequence. Until receipt of the page response by MSC 113 from the BTS 119 near MT 130, the voice network 110 does not have useful information representing the location of the MT 130.

Following receipt by MSC 113 of the page response, an Unsolicited Response (UNSOLRES) message, including a Temporary Local Directory Number (TLDN), is sent to the gateway MSC 112. MSC 112 acknowledges receipt of the unsolicited response and TLDN from MSC 113 with a return Unsolicited Response Return Result (unsolres). Following the acknowledgment, MSC 112 transmits a Route Request Return Result (routreq) forwarding the TLDN to the VLR 115. The TLDN is then forwarded by the VLR 115 to the HLR 114. The HLR 114, in turn, transmits a Location Request Return Result (locreq) forwarding the TLDN to the MSC 111 from which the call was originated. Upon receipt of the TLDN by the originating MSC 111 from the serving MSC 113, the call is set up, and cut through is completed. From this point, a full duplex (two way) telephone call can be conducted between the user of MT 130 and the party originating the incoming call.

It should be apparent that the prior art shown in and described with reference to FIG. 3 achieves call setup without information representing the location of MT 130 being provided to the voice network 110 from the data network 120. Instead, receipt of the page response from MT 130 by the serving MSC 113 provides the first indication of the location of MT 130. Prior to that time, the voice network 110 receives no indication of which MSC within the network will service MT 130. As a result, the call setup routine beginning with transmission of the TLDN by MSC 113 cannot be initiated. Consequently, initiation of the call setup routine is delayed by the need to await the page response from the MT 130 from wherever it is geographically located within the voice network 110.

Figure 4:
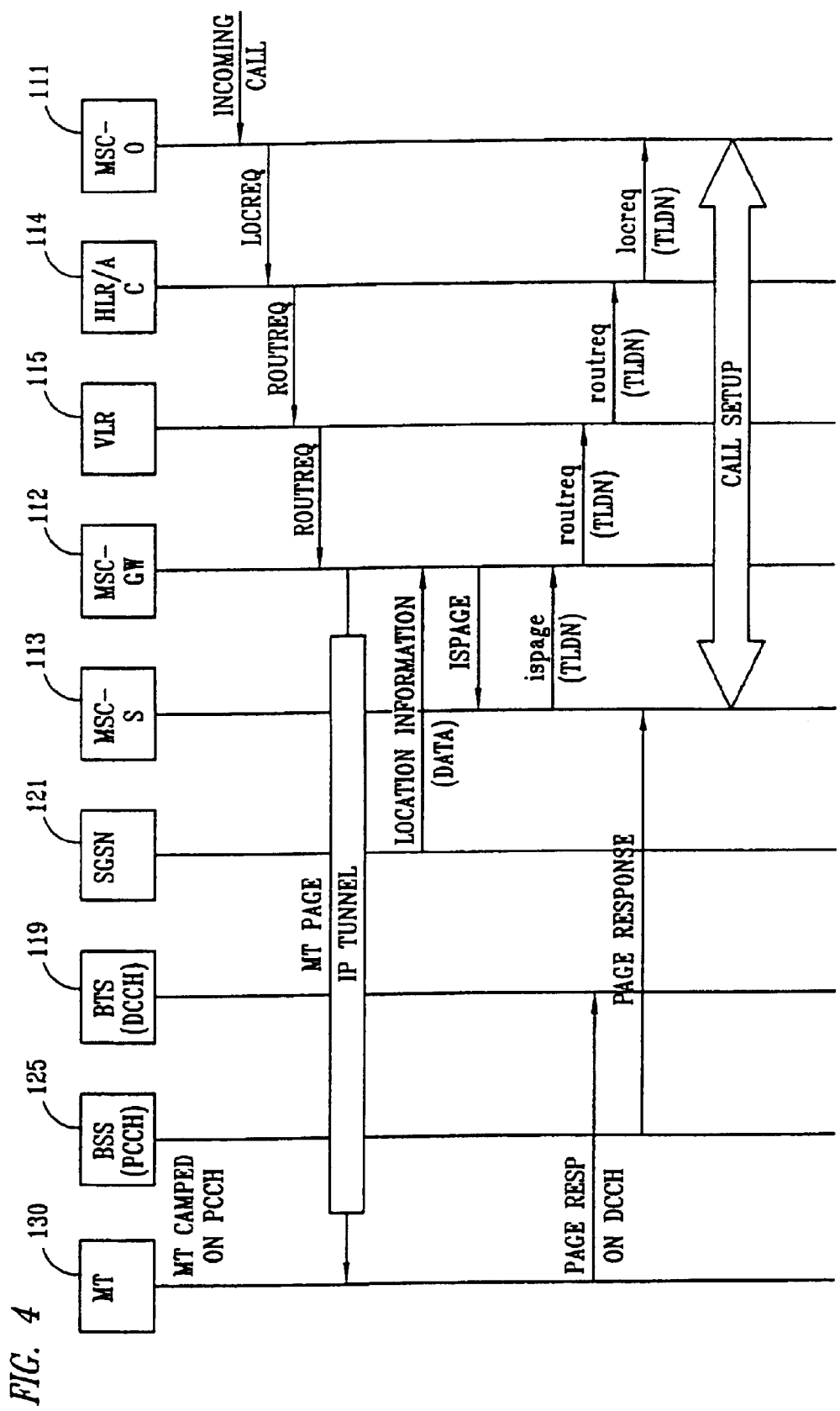
FIG. 4 is a message diagram illustrating the flow of messages through a circuit-switched voice network and a packet-switched data network incorporating the first embodiment of the present invention, setting up a call originating in the circuit-switched voice network to a mobile terminal camped on to a packet-switched data network.

Referring now to FIGS. 1, 2 and 4, shown is the method and means by which the present invention avoids the delay in call setup occasioned in the prior art when an incoming call originates with a circuit-switched network 110 to an MT 130 camping on a data network 120. In FIG. 2, MT 130 is shown camped on the PCCH channel of an adjacent BSS 125 of the data network 120. MT 130 periodically notifies BSS 125 of its presence while idle, awaiting receipt of transmissions from the data network 120. The frequency of such notification is adjustable and is preferably once each hour. The MT 130 may indicate its presence when handing off to or registering with a new BSS. Information indicating that MT 130 is camped on BSS 125 is in turn transmitted by BSS 125 to SGSN 121 following receipt. SGSN 121 stores and updates such location information in a look-up table or database maintained by or co-located with the SGSN 121. The GPRS HLR 123 is typically notified and stores the identity of the SGSN serving the MT 130 when MT 130 enters the area served by that SGSN.

Should MT 130 move within the data network 120 to a location shown in FIG. 2 as occupied by MT 133, for example, the location data representing the location of MT 130 is updated by the SGSN 121. In this manner, the data network 120 can effectively monitor and store the data or other information representing the location of MT 130 within the network. Therefore, data network 120 will maintain and store information representing the location of MT 130 within the region D serviced by SGSN 121. Similarly, the information representing the location of MTs 131, 132 and 133 can be maintained and stored by the data network 120.

As is best shown in FIG. 2, each MSCs 113A, 113B and 113C, which represent all or a portion of the voice network 110, service their respective regions A, B and C through associated BTSs to which each MSC is linked. In the example shown, MSC 112 which functions as the gateway MSC, interfaces directly with SGSN 121, but is not shown. MSC 112 preferably maintains a database, look-up table or other means through which information representing the location of an MT in the data network 120 can be mapped or cross-referenced to a corresponding location within the voice network 110. Such information is preferably stored and accessed from the VLR 115 associated with gateway MSC 112.

To facilitate and expedite call setup in the present invention, SGSN 121 provides to MSC 112 information representing the approximate location of an MT to which an incoming call from the voice network 110 is directed. Such information is provided to the gateway MSC 112 prior to receipt by any MSC of the voice network 110 of a page response from the MT called. Such information is used by the MSC 112 to determine in which of regions A, B and C the called MT is approximately located. MSC 112 then directs the MSC serving that region to initiate a service page to the called MT without the need to await a response from the MT initiated by a page from the data network 120. This not only avoids the delay associated with the data network page and response from the MT, but also avoids the need to expend resources unnecessarily by directing a global page to determine the location of the called MT.

Using this method and means of the present invention, MSC 113B initiates call setup with MT 132, at the direction of MSC 112 and with reference to location information received from SGSN 121, indicating that MT 132 at least has a high probability of being located in region B. Similarly, MSC 113A initiates call setup with MT 131 and at the direction of MSC 112, based on location information received from SGSN 121, indicating that the location of MT 131 is approximately within region A. In like manner, MSC 113C initiates call setup with MT 133, with reference to location information received from SGSN 121, indicating that MT 133 at least has a high probability of being located in region A.

Using such location information, the PCCH can optionally be configured to direct the mobile to the DCCH frequencies of the particular one or more of region(s) A, B and C that the data network 120 indicates that a particular MT can be found.

Referring now to FIG. 4, there is shown a messaging diagram illustrating the sequence of messages through and between networks 110 and 120, utilizing information representing at least an approximate location of MT 130 within the data network 120. The sequence of messages shown differs from the prior art illustrated in FIG. 3 following transmission of the page message to the MT from the gateway MSC 113B via an IP Tunnel. As the tunneled page message is forwarded from the SGSN 121 to the BSS 125, a message bearing location information data is transmitted by the packet-switched network SGSN 121 to the circuit-switched network gateway MSC 112. Such location information represents the approximate location of the MT 130 within the data network 120.

The gateway MSC 112 processes such information to determine which of regions A, B and C the location information correlates with or identifies. Although in a preferred embodiment, MSC 112 makes this determination, it will be appreciated that such processing and data storage could also be performed by the data network 120, utilizing SGSN 121. Thus, the location information received by gateway MSC 112 from SGSN 121 may be an indication of the location of MT 130 within the data network 120, an indication of which of regions A, B and C MT 130 is likely to be found in or a combination of such information.

Following receipt of the location information data, MSC 113B transmits an Inter System Page (ISPAGE) to MSC 113, which is previously determined as servicing the region in which MT 130 is likely to be located. MSC 113 responds with an Inter System Page Return Result (ispage) message to MSC 112, with a TLDN for use in completing call setup. The TLDN is then forwarded by the MSC 112 to the originating MSC 111 via a sequence of Routing Requests Returns Results and a Location Request Return Results (routreq) via VLR 115 and HLR 114. Upon receipt of the TLDN, a call is set up between the MSC 113 serving MT 130 and the MSC 111 through which the incoming call originated.

Because the call setup routine is triggered by the tunneled MT page, call setup is initiated prior to receipt by the serving MSC 113 of a page response from the BSS 125 of the data network 120. Thus, call setup is achieved with the present invention without regard to the time at which a page response is received by the BSS 125 from the MT 130. As a result, a delay of approximately 2 to 5 seconds is typically avoided, resulting in reduced demands on the resources of the voice network 110, an increase in capacity of the network and reduced costs.

Figure 5:
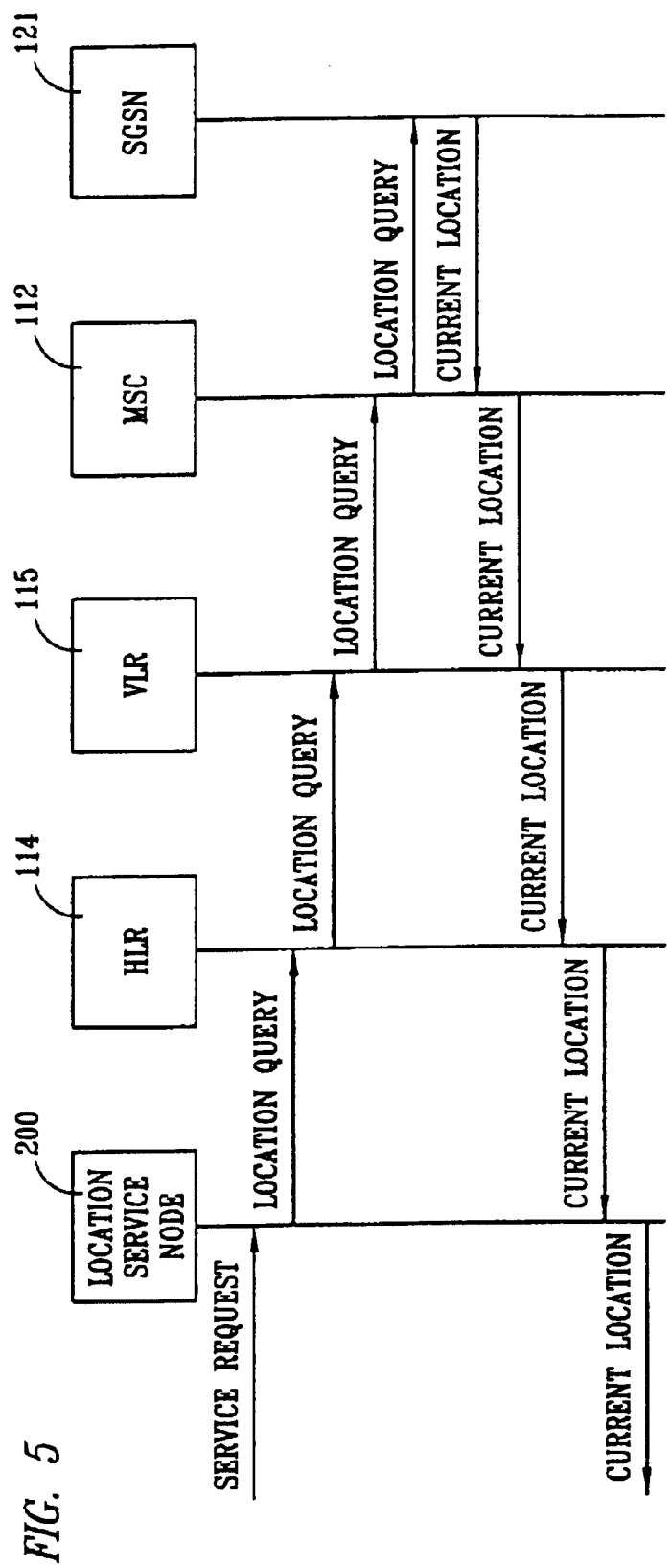
FIG. 5 is a message diagram illustrating the flow of messages between a circuit-switched network and a packet-switched network in a second embodiment of the invention.

Referring now to FIG. 5, there is shown a message diagram illustrating use of the present invention to facilitate enhanced location-based services provided by the circuit-switched network 110. Such location-based services would include, for example, voice-activated directions to the nearest hospital or other location, the cost of call services within a particular location, as well as many others that will be apparent to those skilled in the art.

This is accomplished by providing a method and means by which a Location Service Node 200 providing location-based service and receiving a Service Request message can obtain information representing the current location of the MT 130. Upon receipt of a Service Request, the Location Service Node 200 transmits a Location Query to the HLR 114. A series of Location Queries are then transmitted in succession by the VLR 115, to the MSC 112 and ultimately to the SGSN 121. In response to the Location Query, SGSN 121 provides location information, such as that described with reference to FIGS. 1, 2 and 4, indicating the approximate location of the MT 130 within the voice network 100. Successive messages bearing such location information are transmitted in series back to the Location Service Node 200. Location-based services are then provided with reference to such information representing the current geographic location of the MT 130.

Figure 6:
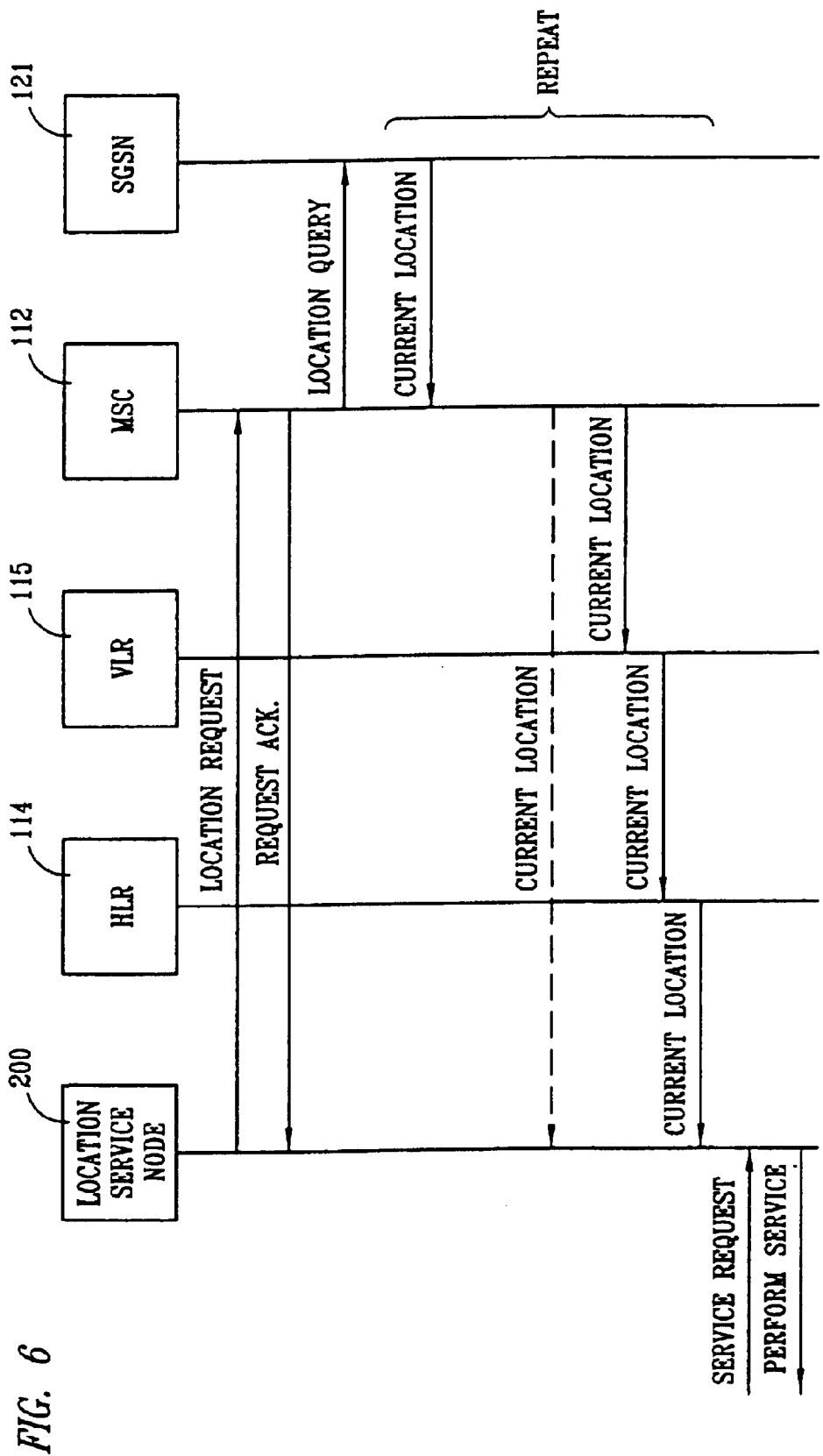
FIG. 6 is a messaging diagram illustrating the flow of messages between a circuit-switched network and a packet-switched network in a third embodiment of the invention.

Referring now to FIG. 6, there is shown a message diagram illustrating a method and means of providing to a Location Service Node 200 the current location of an MT. The LSN 200 may provide a variety of location-based services, such as, for example, notifying a user of the airport gate from which the user's flight departs, as the user approaches the airport. Such flight information may be obtained by the LSN 200 via the Internet.

LSN 200 sends a Location Request message to MSC 112, requesting a single or a periodic update of MT location information of the user. FIG. 6 illustrates one embodiment in which such updates are requested to be provided by MSC 112 to the LSN 200 approximately every fifteen (15) minutes. MSC 112 responds to LSN 200 with a Request Acknowledgment, indicating that the location notification update is initiated. MSC 112 then sends a Location Query message to SGSN 121, requesting receipt of a Current Location message every fifteen (15) minutes, updating MSC 112 with location information indicating the approximate location of the MT within the data network 120.

MSC 112 then transmits a single Current Location message (shown in a broken line) to the LSN 200, providing the current MT location information. Alternatively, a succession of Current Location messages are sent from MSC 112 to VLR 115, from VLR 115 to HLR 114, and from HLR 114 ultimately to LSN 200, providing the current MT location information to LSN 200.

The transmission of Current Location messages from SGSN 121 to the LSN 200 is repeated as frequently as is desired, taking into consideration the mobility of the MT, the services provided by LSN 200, the time of day and in accordance with numerous other factors apparent to those skilled in the art.

Upon receipt of a Service Request message, LSN 200 provides location-based services, indicated by a generic Perform Service message, to the user with reference to the location information received from the data network 120.

What is claimed is:

1. A method of providing location-based services to a mobile terminal in a wireless network comprising the steps of:

providing a packet-switched network;

providing a location service node;

receiving a location-based service request from the mobile terminal at the location service node;

transmitting a location query to a node of the packet-switched network in response to the location-based service request;

providing location information from the same node of the packet-switched network to the location service node in response to the location query; and providing at least one location-based service to the mobile terminal using the location information.

2. The method of claim 1 wherein the step of transmitting further comprises transmitting the location query to a HLR.

3. The method of claim 2 wherein the step of transmitting further comprises transmitting the location query to a VLR.

4. The method of claim 3 wherein the step of transmitting further comprises transmitting the location query to a MSC.

5. The method of claim 4 wherein the step of transmitting further comprises transmitting the location query to a SGSN.

6. The method of claim 1 wherein the step of providing location information further comprises providing the location information to a MSC.

7. The method of claim 6 wherein the step of providing location information further comprises providing the location information to a VLR.

8. The method of claim 7 wherein the step of providing location information further comprises providing the location information to a HLR.

9. The method of claim 8 wherein the step of providing location information further comprises providing the location information to the location service node by the HLR.

10. A method of providing the current location of a mobile terminal comprising the steps of:

providing a location service node;

providing a packet-switched network;

providing a circuit-switched network;

transmitting a location request by the location service node to the circuit-switched network;

in response to the location request, the circuit-switched network transmitting at least one location query to a node of the packet-switched network; and in response to the at least one location query, the packet-switched network transmitting from the same node of the packet-switched network at least one current location message through the circuit-switched network to the location service node.

11. The method of claim 10 wherein the location request requests periodic updates of the current location of the mobile terminal.

12. The method of claim 11 wherein the current location of the mobile terminal is periodically updated in response to the location request.

13. The method of claim 10 wherein the step of transmitting a location request further comprises sending a location request message to a MSC.

14. The method of claim 10 further comprising the step of the MSC sending a request acknowledgment to the location service node in response to receipt of the location request message.

15. The method of claim 13 wherein the location request requests at least one update of the location or the mobile terminal.

16. The method of claim 13 wherein the step of the circuit-switched network transmitting at least one location query to the packet-switched network further comprises the MSC sending at least one location query message to a SGSN.

17. The method of claim 16 wherein the at least one location query message requests receipt of a current location message at a predetermined interval.

18. The method of claim 10 wherein the step of the packet-switched network transmitting at least one current location message through the circuit-switched network to the location service node further comprises a single current location message sent directly from a SGSN to the location service node.

19. The method of claim 10 wherein the step of the packet-switched network transmitting at least one current location message through the circuit-switched network to the location service node further comprises a plurality of current location messages sent from a MSC to a VLR, from the VLR to a HLR, and from the HLR to the location service node.

* * * * *